United States Patent [19]

Maly-Schreiber et al.

[11] Patent Number: 5,567,546

[45] Date of Patent: Oct. 22, 1996

[54] ION CONDUCTOR FOR ELECTROCHEMICAL CELLS

[75] Inventors: Martha Maly-Schreiber; Josef Michel, both of Ulm, Germany

[73] Assignee: Daimler-Benz AG, Germany

[21] Appl. No.: 489,292

[22] Filed: Jun. 9, 1995

[30] Foreign Application Priority Data

Jun. 9, 1994 [DE] Germany .......................... 44 20 095.1

[51] Int. Cl.$^6$ ...................................... H01M 6/04
[52] U.S. Cl. ..................... 429/207; 429/190; 429/192; 429/194; 429/199; 429/206; 521/25; 521/27; 521/28
[58] Field of Search ..................... 429/192, 190, 429/194, 199, 206, 207; 204/421; 521/25, 27, 28

[56] References Cited

U.S. PATENT DOCUMENTS 4,722,877  2/1988  Sammells .................................. 429/192

FOREIGN PATENT DOCUMENTS 0411152  2/1991  European Pat. Off. .
0411156  2/1991  European Pat. Off. .
4241150  6/1994  Germany .

*Primary Examiner*—Bruce F. Bell
*Attorney, Agent, or Firm*—Evenson, McKeown, Edwards & Lenahan P.L.L.C.

[57] ABSTRACT

An ion conductor for electrochemical cells, comprising an alkali metal salt or a mixture of alkali metal salts, and mixed therewith on oligomer and/or polymer (hereinafter referred to simply as "polymers"), having at least one phosphazene base unit. The polymers are chemically stable with respect to the constituents of the ion conductor, and have an inorganic atom or an inorganic compound positioned at the phosphorous atom of at least one phosphazene base unit thereof. To form the ion conductor the alkali metal salts are heated to the melting temperature and the alkali metal salts, preferably fused to a low viscosity state, are admixed with the polymers which are dissolved in the alkali metal salt melt.

16 Claims, 5 Drawing Sheets

ION CONDUCTOR FOR ELECTROCHEMICAL CELLS

BACKGROUND AND SUMMARY OF THE INVENTION

The invention relates to an ion conductor for electrochemical cells of the generic type such as known from European patent document EP 411 156 A1.

European patent document EP 411 156 A1 discusses an ion conductor which comprises polyphosphazene. The polyphosphazene is formed from phosphazene base units which have organic substituents on the phosphorous of a phosphazene base unit. These polyphosphazenes, however, exhibit inadequate chemical stability with respect to the ions of some alkali metal salts, especially lithium, so that their suitability for use in such batteries is quite limited. Moreover, they decompose at elevated temperatures.

The object of the invention is to provide an ion conductor (as classified) of an electrochemical cell which is chemically more stable with respect to ions of alkali metal salts, which under normal conditions, has as low a melting temperature as possible and which decomposes at temperatures that are as high as possible. A further object of the invention is to provide a method for preparing such an ion conductor.

These and other objects and advantages are achieved by the ion conductor according to the invention in which alkali metal salts are mixed with oligomers and/or polymers containing at least one inorganically substituted phosphazene base unit. As a result of this combination, the melting temperature or glass transition temperature Tg of the alkali metal salts of the ion conductor is lowered to the room temperature range and even lower. The ion conductivity of the alkali metal salts of such ion conductors is up to 1000 times greater at room temperature ($T_R$=20° C.) than the ion conductivity of the previously known alkali metal salts whose melting point is usually above 100° C.

This makes it possible for an electrochemical cell comprising the ion conductor according to the invention to be operated, without additional energy, at temperatures as low as room temperature and even lower. During operation, the ion conductor heats up owing to the internal resistance of the electrochemical cell, and consequently its temperature rises. This self-heating of the ion conductor of the electrochemical cell, which may lead to temperatures of the ion conductor and its components of far above 150° C., raises ion conductivity of the alkali metal salts in a known manner.

To ensure reliability of the electrochemical cell, polymers are selected which have phosphazene base units that are chemically stable with respect to the alkali metal salts and have high thermal stability. Of particular advantage in this context are polymers having phosphazene base units, which comprise halogens as side chains on the phosphorous of the phosphazene base unit. Preference in this case is given to dihalophosphazenes. These polyphosphazenes comprising halogens in the side chains, which are known as inorganic polymers in the literature, are thermally stable up to approximately 350° C., and their oligomers comprising from three to seven phosphazene base units are thermally stable even up to above 400° C.; they are therefore particularly suitable for use in traction batteries. In particular, the ion conductor according to the invention is suitable as an electrolyte for electrochemical cells comprising alkali metal-containing active materials such as lithium- and sodium-containing active materials. In some cases, however, thermal stability of the polymer from temperatures as low as 150° C. upward may be appropriate.

The ion conductor according to the invention advantageously contains alkali metal salts preferably comprising more than 3% by weight of the final mixture, in particular between 20% by weight and 60% by weight. In the process according to the invention, these are heated above their melting point and fused. The alkali metal salt melt is admixed with the polymers dissolving in the alkali metal salt melt, and mixing with the alkali metal salts. The requirements with respect to the polymer are in this case that it is chemically stable with respect to the alkali metal salts and that it contains at least one conjugated phosphazene base unit, at whose phosphorous atom at least one inorganic atom or an inorganic compound is positioned.

Owing to their low melting temperature and their high ion conductivity, especially with respect to alkali metal ions, at room temperature, the ion conductors according to the invention can potentially be widely used in alkali metal batteries in which molten salts are used as the electrolyte, e.g. Na/NiCl$_2$ or AlLi/FeS$_2$ batteries;

in which electrode reactions proceed as intercalation reactions;

e.g. in alloys within a single-phase domain for the negative electrode and in the form of intercalation compounds for the positive electrode;

in which gel- or paste-like electrolytes are used which are produced by demobilization of the electrolyte by means of inert and/or ion-conducting solid additives and in which solid or liquid electrodes are employed; and in which gel- or paste-like alkali metals are used which are produced by demobilization of the electrolyte by means of inert and/or ion-conducting solid additives and whose electrodes are arranged as solids in a bipolar sandwich construction.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
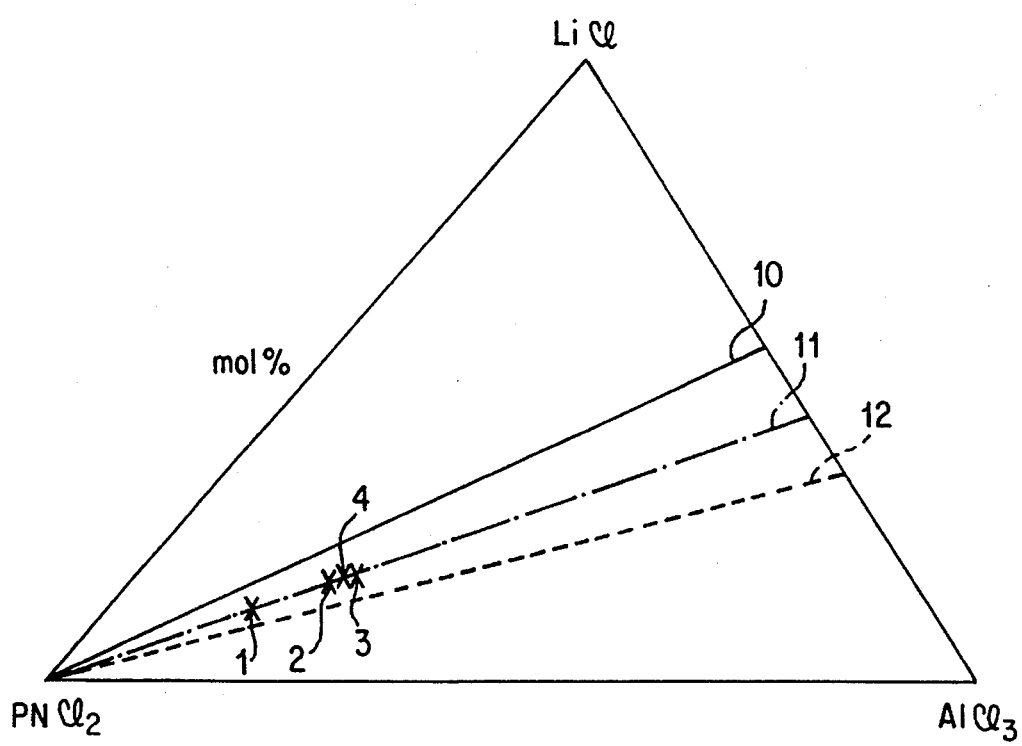
FIG. 1 is a phase diagram of four different specimens of an ion conductor according to the invention, with the composition of the alkali metal salts of the ion conductor and with their ratio to the polymers.

FIG. 1 depicts a phase diagram of four different specimens of an ion conductor according to the invention (specimens 1 to 4), each vertex of the triangle representing the pure substance. Three straight lines are drawn within the area of the triangle, which relates to a constant molar ratio of the alkali metal salts consisting of a mixture of $AlCl_3$ and LiCl. Straight line 10 has a stoichiometric molar ratio between Al and Li; straight line 11 a ratio of 57 mol %; and straight line 12 a ratio of 61 mol %. Along the straight lines, starting from the pure polyphosphazene, the proportion of the alkali metal salts with respect to the proportion of dichloropolyphosphazene in the ion conductor (specimens 1 to 4) increases.

The ion conductor specimens (specimens 1 to 4) shown in the phase diagram according to FIG. 1 all have an Al/Li ratio of 57% in favor of aluminum. What varies in this case is the proportion by weight of the alkali metal salts with respect to the weight of the ion conductor overall (specimens 1 to 4), here given in percent by weight, the ratio of the polyphosphazene to the aluminum, and the ratio of the polyphosphazene to the lithium. The specimens 1 to 4 show the following values:

| Specimen 1 | |
| --- | --- |
| Percent by weight of alkali metal salt: | 40.7 |
| Mole percent Al:Li | 57 |
| Mole percent $PNCl_2$:Li | 2.74 |
| Mole percent $PNCl_2$:Al | 2.08 |
| Specimen 2 | |
| Percent by weight of alkali metal salt: | 49.6 |
| Mole percent Al:Li | 57 |
| Mole percent $PNCl_2$:Li | 2.0 |
| Mole percent $PNCl_2$:Al | 1.51 |
| Specimen 3 | |
| Percent by weight of alkali metal salt: | 55.8 |
| Mole percent Al:Li | 57 |
| Mole percent $PNCl_2$:Li | 1.5 |
| Mole percent $PNCl_2$:Al | 1.13 |
| Specimen 4 | |
| Percent by weight of alkali metal salt: | 51.2 |
| Mole percent Al:Li | 57 |
| Mole percent $PNCl_2$:Li | 1.8 |
| Mole percent $PNCl_2$:Al | 1.36 |

Figure 4:
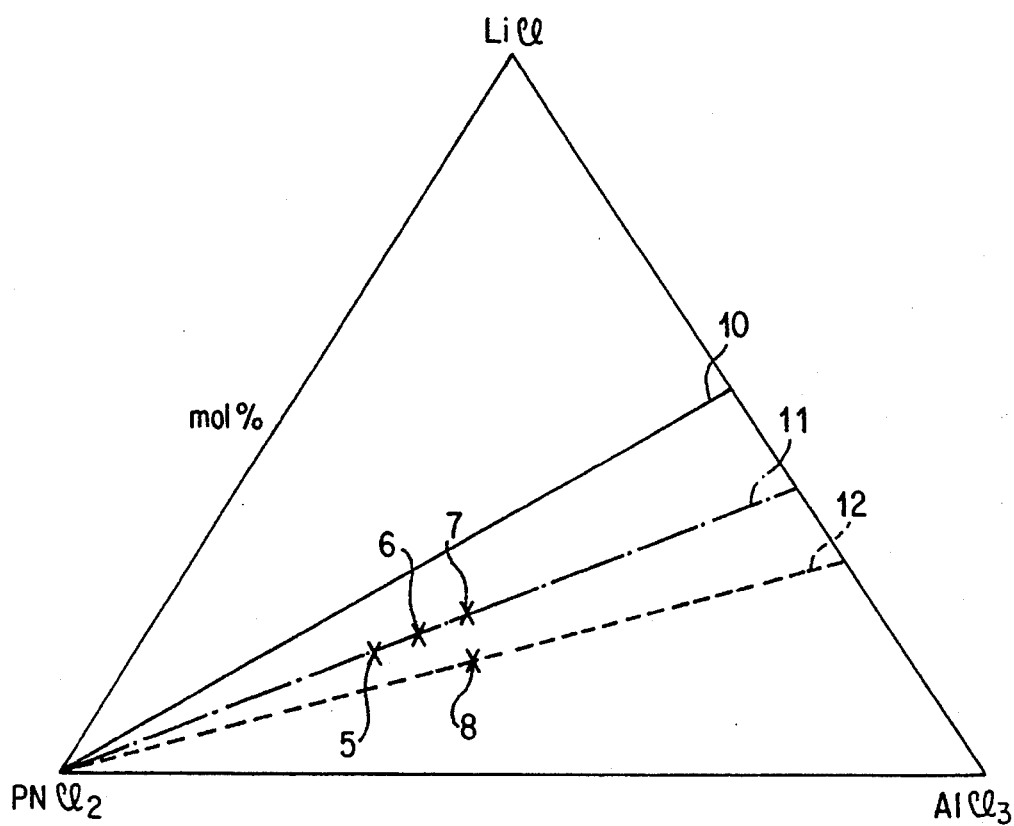
FIG. 4 is a further phase diagram of four further specimens of an ion conductor according to the invention.

To avoid unnecessary repetition, the only aspect discussed for the ion conductors shown in FIG. 4 (specimens 5 to 8) is their composition, specimen 8 also having a different ratio of Al:Li.

| Specimen 5 | |
| --- | --- |
| Percent by weight of alkali metal salt: | 54.4 |
| Mole percent Al:Li | 57 |
| Mole percent $PNCl_2$:Li | 1.58 |
| Mole percent $PNCl_2$:Al | 1.2 |
| Specimen 6 | |
| Percent by weight of alkali metal salt: | 45.9 |
| Mole percent Al:Li | 57 |
| Mole percent $PNCl_2$:Li | 2.23 |
| Mole percent $PNCl_2$:Al | 1.68 |
| Specimen 7 | |
| Percent by weight of alkali metal salt: | 37.5 |
| Mole percent Al:Li | 57 |
| Mole percent $PNCl_2$:Li | 3.14 |
| Mole percent $PNCl_2$:Al | 2.37 |
| Specimen 8 | |
| Percent by weight of alkali metal salt: | 40.7 |
| Mole percent Al:Li | 61.1 |
| Mole percent $PNCl_2$:Li | 3.14 |
| Mole percent $PNCl_2$:Al | 2.0 |

Figure 2:
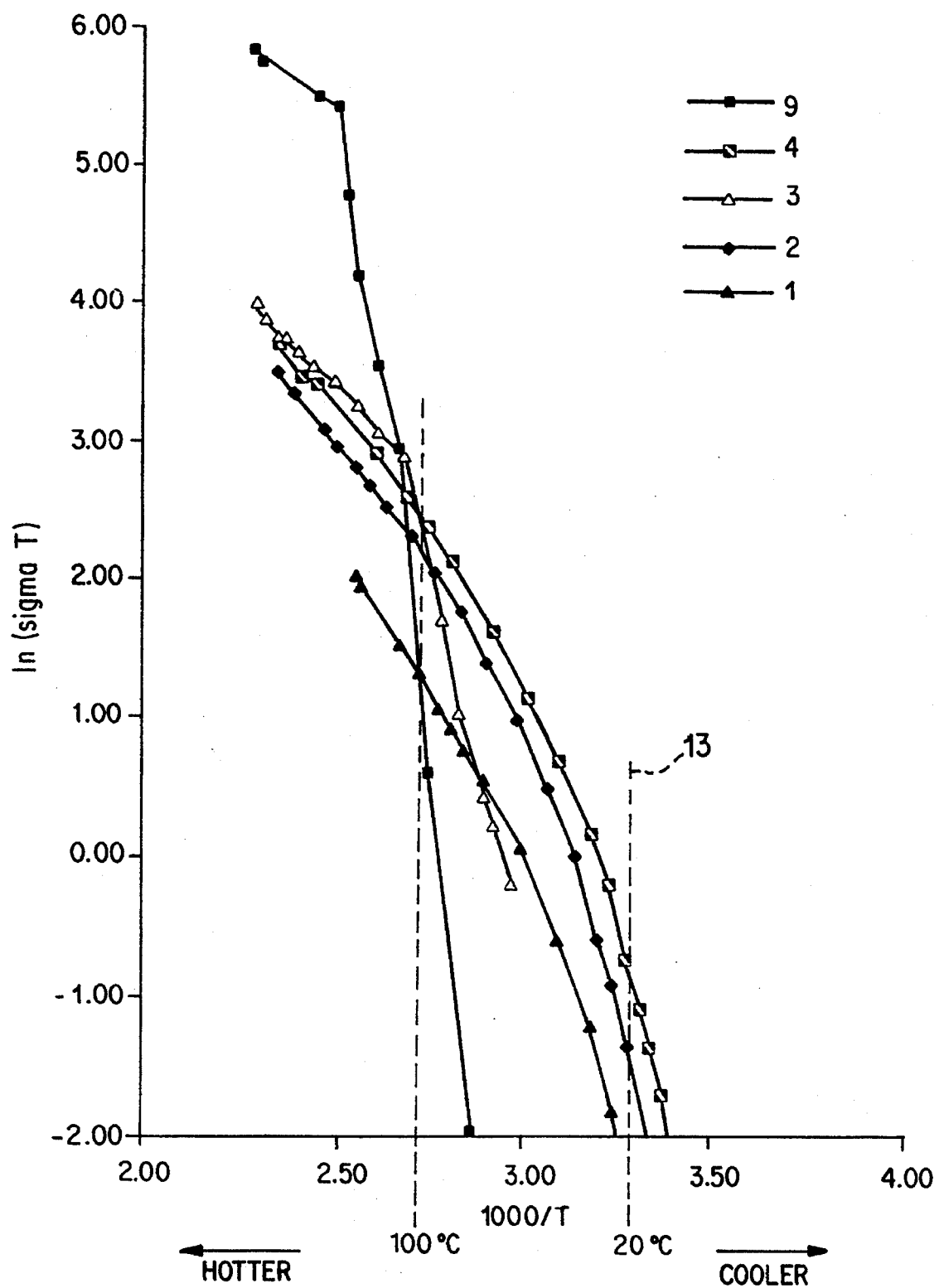
FIG. 2 is a graph which shows the ion conductivity of the various specimens according to FIG. 1, as a function of the inverse of the absolute temperature.
Figure 5:
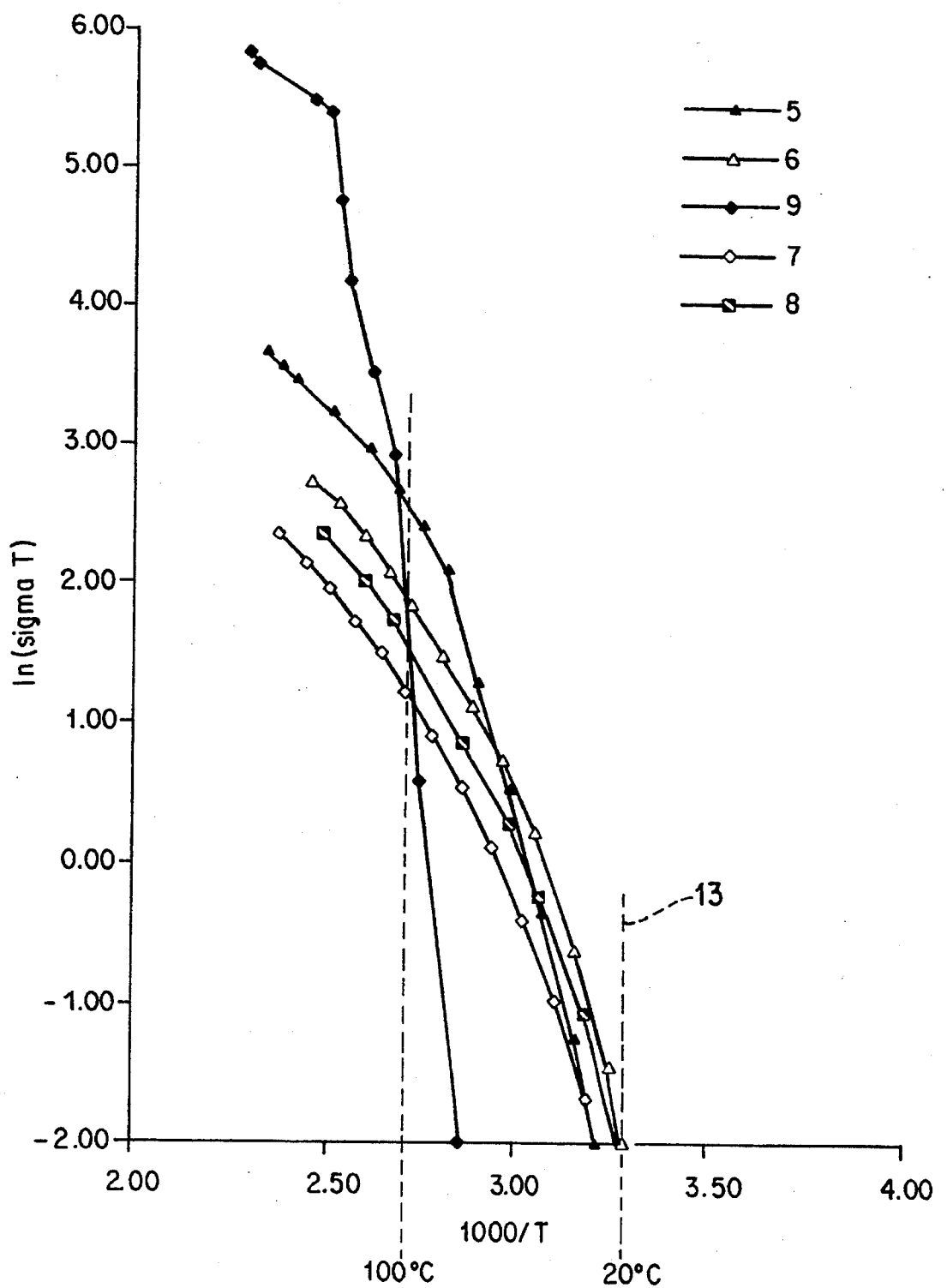
FIG. 5 is a graph which shows the ion conductivity of the various specimens according to FIG. 4, as a function of the inverse of the absolute temperature.

In the Arrhenius diagrams which belong with specimens 1 to 4 (FIG. 2) and 5 to 8 (FIG. 5), respectively, the natural logarithm of the specific electric ion conductivity (in ohms per cm) of the specimen in question is plotted against 1000/T (in ° Kelvin). It is evident from these diagrams that even at room temperature (dashed line 13), the ion conductors (specimens 1 to 8) all have an electric ion conductivity which is sufficient at the start-up of the electrochemical cell, and which is far above those of the pure alkali metal salts. With ion conductors according to the invention, depending on the geometric cross-section, it is possible to achieve ion conductivities which are smaller than $10^{-4}$ Siemens per cm. At the same time, the ion conductivity can be increased, via the self-heating process, by decades beyond the internal resistance due to the ion conductors (specimens 1 to 8), the ion conductivity of the ion conductors (specimens 1 to 8) approximately corresponding to that of the pure alkali metal salt in the region of approximately 100° C., i.e., in the region of their melting point.

Additionally, a dependence of the ion conductivity on the proportion of the alkali metal salts in the ion conductors (specimens 1 to 8) is discernible. Thus, for a salt proportion in the ion conductors of more than approximately 54 percent by weight (specimen 3 and specimen 5), the ion conductivity of the ion conductors below approximately 70° C. is smaller than that of ion conductors having a proportion by weight of less than approximately 52 percent by weight, whereas the ion conductivity of these two specimens is better above approximately 70° C.

This means that ion conductors having an alkali metal salt proportion of more than approximately 54% by weight very closely approach the ion conductivity behavior of the pure alkali metal salts. Such ion conductors may therefore be less suitable for electrochemical cells which are to be ready for operation at room temperature, compared with ion conductors having an alkali metal salt proportion of less than 51% by weight.

On the other hand, these ion conductors do have a better ion conductivity at higher temperatures, and their use may therefore entirely make sense. At any rate, an electrochemical cell can be readily tailored to a particular application by means of the proportion of the alkali metal salt contained therein.

Figure 3:
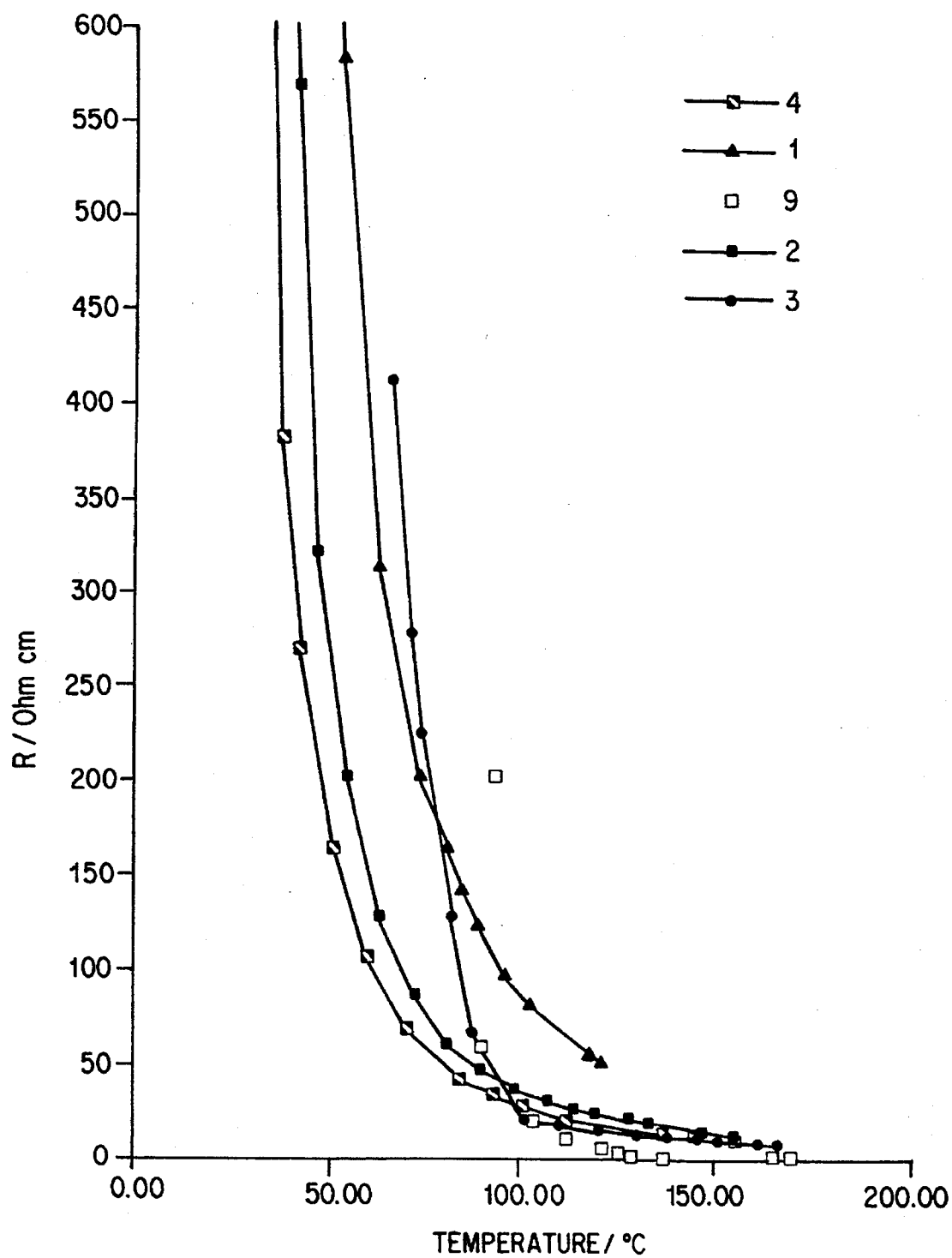
FIG. 3 is a graph which shows the resistance of the various specimens according to FIG. 1, as a function of the temperature in degrees Celsius.
Figure 6:
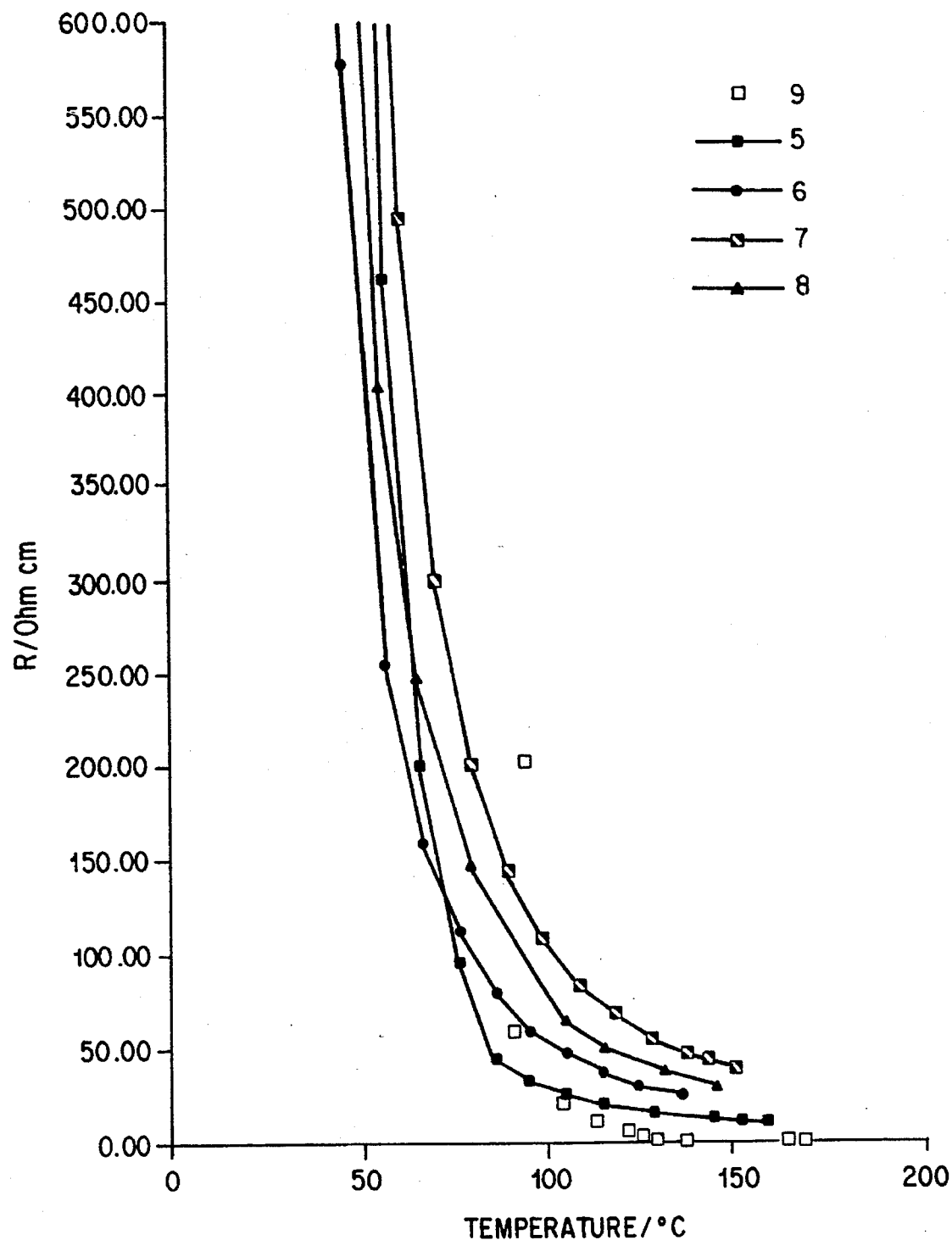
FIG. 6 is a graph which shows the resistance of the various specimens according to FIG. 4, as a function of the temperature in degrees Celsius.

In the resistance diagrams belonging with specimens 1 to 4 (FIG. 3) and 5 to 8 (FIG. 6), respectively, the electrical resistance (in ohm cm) of the ion conductors in question (specimens 1 to 8) is plotted against the temperature (in degrees Celsius). It is evident from these diagrams that the ion conductors (specimens 1 to 8) all have a resistance which drops with decreasing temperatures, and have an appreciable resistance, even at higher temperatures (above 120° C.), of between 10 ohm cm and 50 ohm cm.

As in the case of ion conductivity, here too the behavior of ion conductors having a proportion of alkali metal salts of above approximately 54% by weight approaches the corresponding behavior of the pure alkali metal salts, and consequently such ion conductors (specimen 3 and specimen 5) have a resistance which does not drop until later. On the other hand, the proportion of alkali metal salts should not be too small either, since otherwise, as shown by specimen 7, the resistance is higher throughout and also does not drop until later. However, if marked self-heating of the ion conductors is desirable, this may even make sense.

The preparation of an ion conductor, together with the weights employed, is described below with reference to a further illustrative embodiment. In this embodiment 15 g of an anhydrous alkali metal salt mixture consisting of aluminum chloride and lithium chloride, with a lithium chloride proportion of 57 mol %, is fused in a dry atmosphere. Above the melting temperature of the salt mixture, at 150° C. to 170° C., the salt melt is admixed with poly(dichlorophosphazene). The poly(dichlorophosphazene) is prepared by a thermal polymerization of the trimer, without catalysis, with subsequent separation of the starting material not yet polymerized, or alternatively catalyzed by boron trichloride and without further purification. At the above mentioned temperatures, the final mixture (polyphosphazene and alkali metal salt mixture) is stirred for a long time, until a homogeneous low-viscosity mixture has formed. The duration of the stirring operation is, depending on the quantitative proportions, approximately from two to three days. To set the viscosity of as highly dispersive an ion conductor as possible it is expedient to admix the melt with inorganic additives, in particular $Al_2O_3$, $TiO_2$, $SiO_2$, and the like.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An ion conductor for an electrochemical cell comprising:

at least one constituent selected from the group consisting of alkali metal salts and mixtures thereof;

a polymer which is chemically stable with respect to constituents of the ion conductor and has at least one phosphazene base unit; and at least one inorganic constituent positioned at the phosphorous atom of the phosphazene base unit.

2. An ion conductor according to claim 1 wherein the proportion of the alkali metal salts in the ion conductor, based on the total weight of the ion conductor, is greater than 3% by weight.

3. An ion conductor according to claim 1 wherein the proportion of the alkali metal salts in the ion conductor, based on the total weight of the ion conductor, is greater than 20% by weight and less than 60% by weight.

4. An ion conductor according to claim 1 wherein the ion conductor contains at least one of the following anions: $BF_4^-$, $AlCl_4^-$, $PF_4^-$ and $x^-$ where x represents halogens.

5. An ion conductor according to claim 4 wherein said halogens comprise at least one member selected from the group consisting of chloride, fluoride, bromide and iodide.

6. An ion conductor according to claim 1 wherein said polymer is a ring or chain polymer which is at least partially cross-linked.

7. An ion conductor according to claim 1 wherein:

the ion conductor is substantially homogeneous; and the polymers have a melting temperature which is below that of the pure alkali metal salts or pure alkali metal salt mixture which is used.

8. An ion conductor according to claim 1 wherein the phosphazene base unit has at least one constituent containing a halogen at the phosphorous atom.

9. An ion conductor according to claim 1 wherein the phosphazene base unit is a halophosphazene.

10. An ion conductor according to claim 9 wherein the phosphazene base unit is a dihalophosphazene.

11. An ion conductor according to claim 10 wherein the phosphazene base unit is a chlorophosphazene.

12. An ion conductor according to claim 11 wherein the phosphazene base unit is a dichlorophosphazene.

13. An ion conductor according to claim 1 wherein the ion conductor comprises, as electrolyte salts, a mixture of aluminum chloride ($AlCl_3$) and lithium chloride (LiCl).

14. An ion conductor according to claim 1 wherein the proportion of the alkali metal salts in the ion conductor, based on the weight of the final mixture of the ion conductor formed from polymers and alkali metal salts is between 30% by weight and 60% by weight.

15. An ion conductor according to claim 1 wherein the proportion of the alkali metal salts in the ion conductor, based on the weight of the final mixture of the ion conductor formed from polymers and alkali metal salts is between 40% by weight and 54% by weight.

16. A process for preparing an ion conductor for an electrochemical cell comprising alkali metal salts and polymers formed from phosphazene base units, said process comprising the steps of:

heating the alkali metal salts to a melting temperature thereof to form an alkali metal salt melt; and mixing and dissolving the polymers in the alkali metal salt melt;

wherein said polymers are chemically stable with respect to constituents of the ion conductor and have at least one inorganic constituent positioned at the phosphorous of the phosphazene base unit.

* * * * *